US012631257B2

(12) United States Patent
   Takahashi

(10) Patent No.: US 12,631,257 B2
(45) Date of Patent: May 19, 2026

(54) SEAL DEVICE AND CONSTRUCTION MACHINE

(71) Applicant: Nabtesco Corporation, Tokyo (JP)

(72) Inventor: Masahiro Takahashi, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/775,769

(22) Filed: Jul. 17, 2024

(65) Prior Publication Data
   US 2025/0035162 A1    Jan. 30, 2025

(30) Foreign Application Priority Data
   Jul. 28, 2023    (JP) ................................ 2023-123222

(51) Int. Cl.
   *F16J 15/34*        (2006.01)
   *F16C 33/78*        (2006.01)
(52) U.S. Cl.
   CPC ......... *F16J 15/344* (2013.01); *F16C 33/7886* (2013.01); *F16C 2350/26* (2013.01)
(58) Field of Classification Search
   CPC ...... F16J 15/344; F16J 15/38; F16C 33/7836; F16C 33/7886; F16C 2350/26; E02F 9/006
   See application file for complete search history.

(56) References Cited

U.S. PATENT DOCUMENTS 2,583,671 A * 1/1952 Schmitter ................ F16J 15/38
                                                        277/408
3,905,607 A * 9/1975 Maguire ................ B62D 55/15
                                                        277/382

(Continued)

FOREIGN PATENT DOCUMENTS

EP          3022470 B1      8/2020
JP          59-93573 A      5/1984

(Continued)

OTHER PUBLICATIONS

Extended European Search Report dated Jan. 7, 2025, issued in corresponding European Patent Application No. 24189518.4 (10 pgs.).

*Primary Examiner* — Nicholas L Foster
(74) *Attorney, Agent, or Firm* — Pillsbury Winthrop Shaw Pittman, LLP

(57)        ABSTRACT

The present disclosure relates to a sealing device and a construction machine. The seal device includes a first member, a second member, a seal ring, and an elastic ring. The first member has an inner circumferential surface. The second member rotates relative to the first member. The second member faces the first member in a rotation axis direction. The seal ring has an outer circumferential surface facing the inner circumferential surface in a radial direction and spaced apart from the inner circumferential surface. The seal ring has a sealing surface in sliding contact with the second member. An elastically deformable elastic ring is disposed between the inner circumferential surface of the first member and the outer circumferential surface of the seal ring. The elastic ring presses the seal surface of the seal ring against the second member to seal between the seal surface and the second member.

5 Claims, 6 Drawing Sheets

(56) References Cited

U.S. PATENT DOCUMENTS

| | | | | |
|---|---|---|---|---|
| 4,351,533 | A * | 9/1982 | Moore | F16J 15/344 |
| | | | | 277/362 |
| 4,844,483 | A * | 7/1989 | Iijima | B60B 27/02 |
| | | | | 277/408 |
| 6,783,129 | B2 * | 8/2004 | Akita | F16J 15/344 |
| | | | | 277/402 |
| 7,476,174 | B2 * | 1/2009 | Fujimoto | F16H 1/32 |
| | | | | 475/180 |
| 7,681,889 | B2 * | 3/2010 | Tsuboi | F16J 15/344 |
| | | | | 277/377 |
| 7,811,193 | B2 * | 10/2010 | Nakamura | F16H 1/46 |
| | | | | 475/179 |
| 8,020,874 | B2 * | 9/2011 | Kometani | F16J 15/344 |
| | | | | 277/423 |
| 8,356,680 | B2 * | 1/2013 | Jackson | B62D 55/125 |
| | | | | 180/9.1 |
| 8,858,383 | B2 * | 10/2014 | Nishioka | F16H 1/32 |
| | | | | 475/170 |
| 9,333,999 | B2 * | 5/2016 | Weeks | B62D 55/20 |
| 9,656,705 | B2 * | 5/2017 | Kalmes | B62D 55/15 |
| 9,751,576 | B2 * | 9/2017 | Suzuki | F16C 33/7879 |
| 9,890,516 | B2 * | 2/2018 | Doi | F16C 19/26 |
| 10,343,733 | B2 * | 7/2019 | Iijima | B62D 55/088 |
| 10,955,056 | B2 * | 3/2021 | Schoening | F16J 15/344 |
| 11,346,394 | B2 * | 5/2022 | Iijima | F16C 11/045 |
| 11,608,876 | B2 * | 3/2023 | Takahashi | F16H 57/021 |
| 11,878,747 | B2 * | 1/2024 | Takahashi | B62D 5/046 |
| 11,964,707 | B2 * | 4/2024 | Takahashi | F16H 1/32 |
| 12,038,070 | B2 * | 7/2024 | Hisada | F16H 1/32 |
| 2003/0102635 | A1 * | 6/2003 | Akita | F16J 15/344 |
| | | | | 277/549 |
| 2008/0050261 | A1 * | 2/2008 | Roddis | F16J 15/348 |
| | | | | 418/104 |
| 2009/0085303 | A1 * | 4/2009 | Kometani | F16C 33/76 |
| | | | | 277/411 |
| 2011/0012314 | A1 * | 1/2011 | Nakamura | F16J 15/008 |
| | | | | 277/562 |
| 2012/0163904 | A1 * | 6/2012 | Liang | F16C 33/74 |
| | | | | 277/361 |
| 2016/0229470 | A1 * | 8/2016 | Suzuki | F16C 43/045 |
| 2016/0340864 | A1 * | 11/2016 | Doi | E02F 9/121 |
| 2019/0162281 | A1 * | 5/2019 | Nakamura | B62D 5/04 |
| 2019/0234517 | A1 * | 8/2019 | Schoening | F16J 15/46 |
| 2021/0285550 | A1 * | 9/2021 | Iwanami | F16J 15/40 |
| 2021/0293271 | A1 * | 9/2021 | Iijima | E02F 9/006 |
| 2022/0063708 | A1 * | 3/2022 | Takahashi | B62D 5/0427 |
| 2022/0063709 | A1 * | 3/2022 | Takahashi | F16H 1/32 |
| 2022/0065329 | A1 * | 3/2022 | Takahashi | F16H 57/021 |
| 2022/0314782 | A1 * | 10/2022 | Shinozaki | B62D 55/125 |
| 2022/0316185 | A1 * | 10/2022 | Komori | E02F 3/32 |
| 2022/0316563 | A1 * | 10/2022 | Hisada | F16H 19/08 |
| 2023/0160173 | A1 * | 5/2023 | Komori | F15B 15/20 |
| | | | | 414/722 |
| 2023/0183940 | A1 * | 6/2023 | Hisada | E02F 9/0866 |
| | | | | 74/606 R |
| 2024/0328486 | A1 * | 10/2024 | Hisada | E02F 9/006 |
| 2025/0035162 | A1 * | 1/2025 | Takahashi | F16C 33/7883 |
| 2025/0074520 | A1 * | 3/2025 | Nogi | F16J 15/34 |
| 2025/0251038 | A1 * | 8/2025 | Wanaka | F16H 57/08 |

FOREIGN PATENT DOCUMENTS

| | | | |
|---|---|---|---|
| JP | 59-93574 | A | 5/1984 |
| JP | 6453880 | B2 | 12/2018 |

* cited by examiner

SEAL DEVICE AND CONSTRUCTION MACHINE

CROSS-REFERENCE TO RELATED APPLICATIONS

This application is based on and claims the benefit of priority from Japanese Patent Application Serial No. 2023-123222 (filed on Jul. 28, 2023), the contents of which are hereby incorporated by reference in their entirety.

TECHNICAL FIELD

The present disclosure relates to a sealing device and a construction machine.

BACKGROUND

Construction machinery such as bulldozers or hydraulic excavators are used in harsh environments. For this reason, seal devices with high sealing performance and durability are used in moving parts of the construction machinery to prevent foreign substances such as dirt and sand from entering into the construction machinery and leakage of lubricating oil. For example, a floating seal device is known as such a seal device. The floating seal device includes a pair of seal rings that seal between first and second members that rotate relative to each other, and an O-ring provided on the outer circumference of each seal ring.

A recess or the like is formed in each of the first and second members to receive the seal ring. The seal rings are arranged on the inner circumference of each of the first and second members at radial intervals. The seal ring has a seal surface. When the seal rings are received in the first and second members, the seal surfaces in the first and second members face and contact each other. The seal surfaces slide against each other. The O-rings are held between the inner circumferences of the first and second members and the outer circumferences of the seal rings. The outer circumferential surface of each seal ring is formed to be inclined. Thus, the seal surfaces of the pair of seal rings are pressed against each other by the O-rings. This seals the space between the first member and the second member.

As described above, the floating seal device requires the seal ring to be received in each of the first and second members. This increases the size of the seal device.

SUMMARY

The present disclosure provides a seal device and construction machine that can be downsized while having high sealing performance and durability.

A seal device according to one aspect of the disclosure includes: a first member having an inner circumferential surface; a second member rotating relative to the first member, the second member facing the first member in a rotation axis direction; a seal ring having an outer circumferential surface that faces the inner circumferential surface in a radial direction and is spaced apart from the inner circumferential surface, the seal ring having a seal surface in sliding contact with the second member; and an elastically deformable elastic ring disposed between the inner circumferential surface of the first member and the outer circumferential surface of the seal ring. The elastic ring presses the seal surface of the seal ring against the second member to seal between the seal surface and the second member.

In this way, the seal device can be configured with a single seal ring. Thus, high sealing performance and durability of the seal device can be ensured, and the size can be reduced.

The above seal device may further include a third member that is rotatable relative to the first member and received in the first member. The first member may be formed in a cylindrical shape with an opening. The second member may be a cover provided at an end of the third member in the rotation axis direction. The cover may close the opening of the first member.

The first member and the third member may be rotatable relative to each other via bearings. The seal ring and the elastic ring may be arranged in line with the respective bearings in a radial direction perpendicular to the rotation axis direction.

The above seal device may include a transmission mechanism connecting the first member and the third member. The transmission mechanism changes speed of rotation of one of the first member or the third member and transmits the rotation to the other of the first member or the third member.

The above seal device may further include a third member that is rotatable relative to the second member and received in the second member. The second member may be formed in a cylindrical shape with an opening. The first member may be a cover provided at an end of the third member in the rotation axis direction. The cover may close the opening of the second member. The seal surface is pressed against an end of the second member in the rotation axis direction.

In the above seal device, the second member and the third member may be rotatable relative to each other via bearings. The seal ring and the elastic ring may be arranged in line with the respective bearings in a radial direction perpendicular to the rotation axis direction.

The above seal device may include a transmission mechanism connecting the second member and the third member. The transmission mechanism changes speed of rotation of one of the second member or the third member and transmits the rotation to the other of the second member or the third member.

A construction machine according to another aspect of the disclosure includes vehicle body having a moving part in which a seal device is provided. The seal device includes: a first member having an inner circumferential surface, the first member being shared with the moving part; a second member rotating relative to the first member, the second member facing the first member in a rotation axis direction and being shared with a part of the moving part; a seal ring having an outer circumferential surface that faces the inner circumferential surface in a radial direction and is spaced apart from the inner circumferential surface, the seal ring having a seal surface in sliding contact with the second member; an elastically deformable elastic ring disposed between the inner circumferential surface of the first member and the outer circumferential surface of the seal ring. The elastic ring presses the seal surface of the seal ring against the second member to seal between the seal surface and the second member.

In this way, the seal device can be configured with a single seal ring. Thus, high sealing performance and durability of the seal device can be ensured, and the size can be reduced. Therefore, it is possible to provide highly functional construction machinery.

3

Advantageous Effects

The seal device and construction machine described above have high sealing performance and durability, and can be reduced in size.

DESCRIPTION OF THE EMBODIMENTS

The embodiments of the present invention will be hereinafter described with reference to the drawings.

<Excavator>

Figure 1:
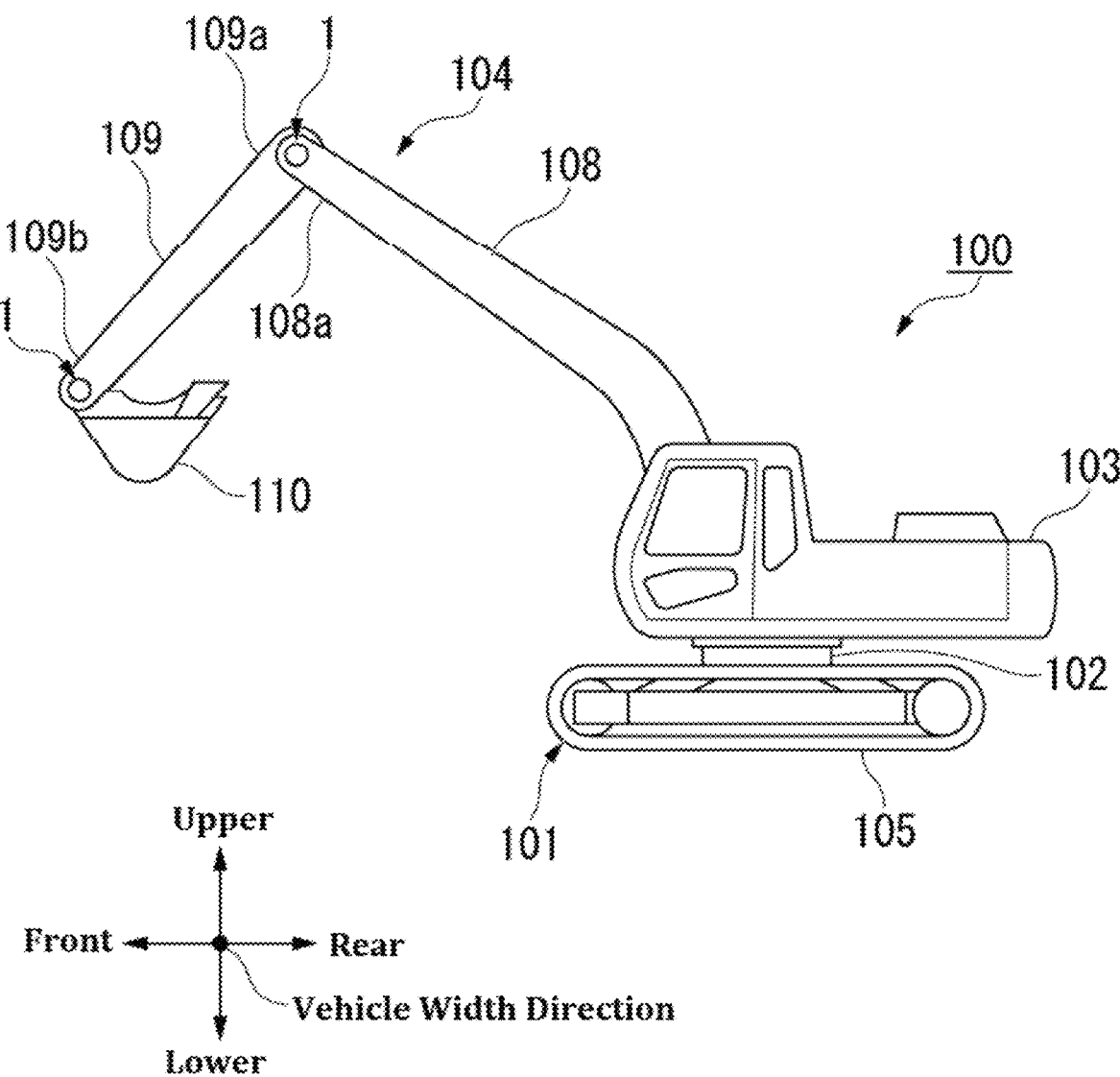
FIG. 1 schematically illustrates a configuration of an excavator according to embodiments of the present disclosure, viewed from the side.

FIG. 1 schematically illustrates an excavator 100, which is one example of a construction machine, according to the embodiment of the present disclosure, viewed from the side. In the following description, a front direction to which an operator of the excavator 100 faces is simply referred to as the front. The opposite side to the front in the horizontal direction is referred to as the rear. The upper and lower directions with the excavator 100 placed on a road surface is simply referred to as the vertical direction. A direction orthogonal to the front-rear direction and the vertical direction is referred to as a vehicle width direction. FIG. 1 shows the excavator 100 as viewed from the vehicle width direction.

As shown in FIG. 1, the excavator 100 includes a self-propelled undercarriage 101, a slewable upper structure 103 provided on top of the undercarriage 101 via a slewing mechanism 102, and an operating unit 104 provided on the slewable upper structure 103. The undercarriage 101 and the slewing mechanism 102 are driven, for example, by an unshown electric motor with a speed reducer. The undercarriage 101 includes, for example, two continuous tracks 105 arranged side by side in the vehicle width direction. However, the configuration of the undercarriage 101 is not limited to the embodiment, and wheels or other structures may be used in place of the continuous tracks 105. The upper structure 103 slews or rotates relative to the undercarriage 101.

The operating unit 104 includes a boom 108 and an arm 109 both extending in the front-rear direction, and a bucket 110 attached to the arm 109. The boom 108, the arm 109, and the bucket 110 are rotatably connected to each other via drive devices 1. Specifically, one end of the boom 108 closer to the slewable upper structure 103 in the longitudinal direction, which is not shown in the drawing, is rotatably coupled to the slewable upper structure 103 via the drive device 1. FIG. 1 does not show the drive device 1 provided at the one end of the boom 108.

One end 109a of the arm 109 in the longitudinal direction is rotatably coupled to the other end 108a of the boom 108 opposite to the one end in the longitudinal direction via the drive device 1. The bucket 110 is rotatably coupled to the other end 109b of the arm 109 opposite to the one end 109a in the longitudinal direction via the drive device 1. The drive devices 1 provided in the coupling portions all have the same configuration. Therefore, in the following description, only the drive device 1 that couples the one end 109a of the arm 109 to the other end 108a of the boom 108 will be described, and description of the other drive devices 1 will be hereunder omitted.

<Drive Device>

Figure 2:
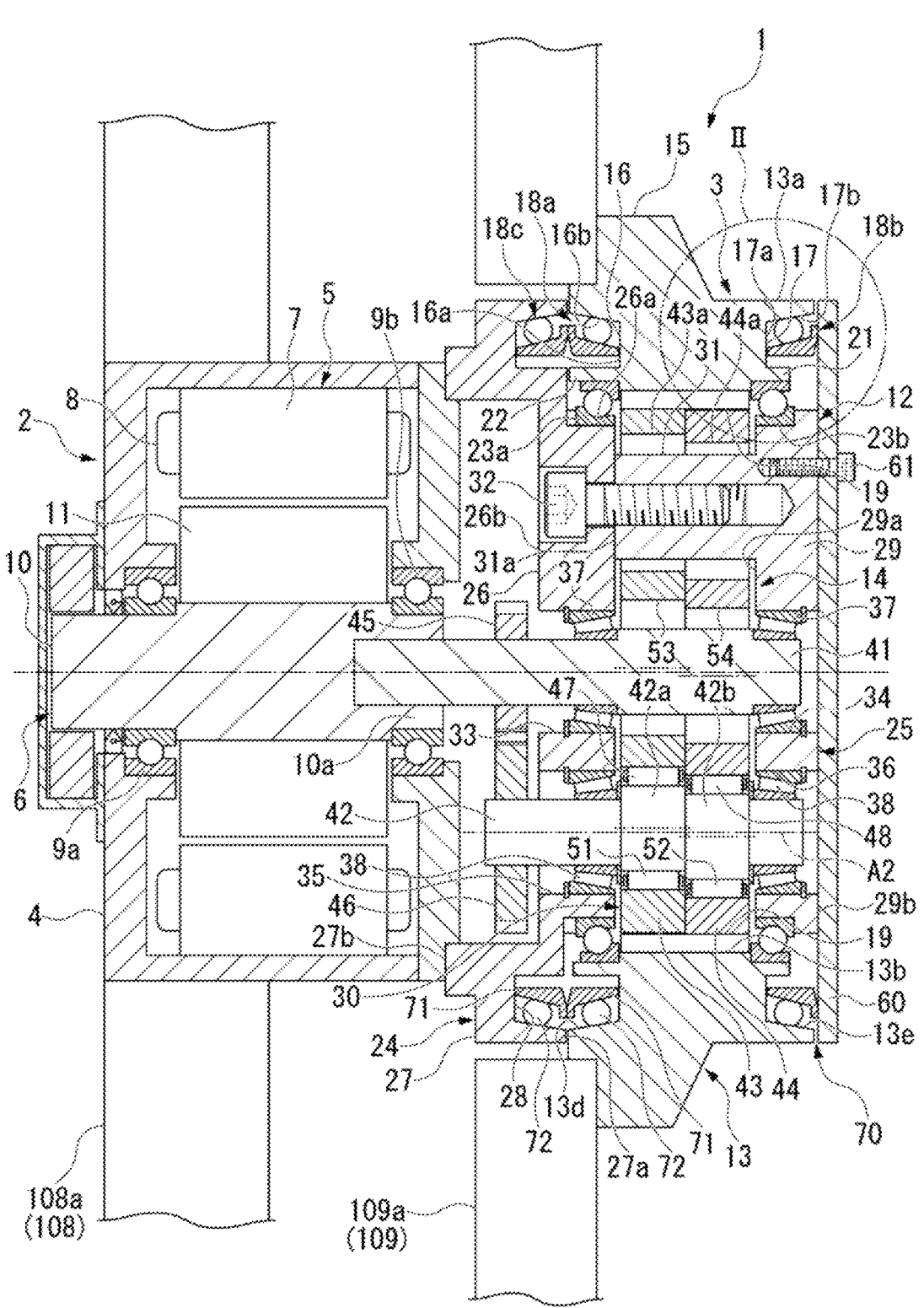
FIG. 2 is a sectional view showing a drive device according to the embodiments of the disclosure.

FIG. 2 is a sectional view of the drive device 1. As shown in FIG. 2, the drive device 1 includes a motor 2 and a speed reducer 3. The motor 2 is fixed to the other end 108a of the boom 108. The speed reducer 3 is connected to the motor 2 and fixed to one end 109a of the arm 109.

<Motor>

The motor 2 includes a motor case 4, a stator 5, and a rotor 6. The motor case 4 is fixed to the boom 108. The stator 5 is housed in the motor casing 4. The stator 5 has a substantially cylindrical shape. The rotor 6 is situated on the radially inner side of the stator 5. The stator 5 includes a cylindrical stator core 7 and a coil 8 wound around the stator core 7. The outer circumference surface of the stator core 7 is fitted and fixed to the inner circumference surface of the motor case 4. The rotor 6 includes a rotor shaft 10 and a rotor core 11. The rotor shaft 10 is rotatably supported by the motor case 4 via bearings 9a, 9b. The rotor core 11 is fitted and fixed onto the outer circumference surface of the rotor shaft 10. The rotor core 11 is equipped with magnets, not shown.

In this configuration, when the coil 8 is energized, interlinked magnetic flux is generated in the stator 5. Magnetic attractive and repulsive forces are generated between this interlinked magnetic flux and the magnets of the rotor 6. This causes the rotor core 11 and rotor shaft 10 to rotate continuously as a single unit. The rotor rotation axis A1 of the rotor shaft 10 coincides with the rotation axis of the arm 109 rotating relative to the boom 108. In the following description, a direction parallel to the rotor rotation axis A1 is referred to as an axial direction, a rotational direction of the rotor 6 is referred to as a rotational direction, and a radial direction of the rotor 6 orthogonal to the axial direction and the circumferential direction is simply referred to as a radial direction.

<Speed Reducer>

The speed reducer 3 includes a fixed portion 12 (an example of a third member in the claim), an output portion 13 (an example of a first member in the claim), a speed reduction mechanism 14, and a seal device 70. The fixed portion 12 is fixed to the motor case 4. The output portion 13 surrounds the fixed portion 12. The output portion 13 is supported rotatably relative to the fixed portion 12. The output portion 13 is formed in a cylindrical shape. The speed reduction mechanism 14 is connected to the rotor shaft 10. The seal device 70 is provided in the fixed portion 12 and the output portion 13. The speed reduction mechanism 14 is an example of a transmission mechanism. The central axis of the output portion 13 coincides with the rotor rotation axis A1. An outer flange 15 protruding radially outward is integrally formed on the outer circumferential surface 13a of the output portion 13. The end 109a of the arm 109 is fixed to the outer flange 15.

Seal receiving recesses 16 and 17 (first seal receiving recess 16, second seal receiving recess 17) are formed in radially outer parts of the output portion 13. Each of the seal receiving recesses 16, 17 is formed such that the diameter of a part of the inner circumferential surface 13*b* of the output portion 13 is increased by a step 16*a*, 17*a*, respectively. Each of the seal receiving recesses 16, 17 opens toward the outside in the axial direction. In other words, apertures 13*d*, 13*e* (first aperture 13*d*, second aperture 13*e*) are formed in the axially outer-side portions of the output portion 13. The respective inner circumferential surfaces 16*b*, 17*b* of the seal storage recesses 16, 17 are sloped so that the inner diameter gradually increases toward the axially outer side.

Of the seal receiving recesses 16, 17, the first seal receiving recess 16 situated closer to the motor 2*a* is provided with a first floating seal 18*a*. Of the seal receiving recesses 16, 17, a second floating seal 18*b* is provided in the second seal receiving recess 17 situated away from the motor 2. The second floating seal 18*b* is one component of the seal device 70. The respective configurations of the floating seals 18*a* and 18*b* will be described in detail later.

A plurality of internal teeth 19 are provided on the inner circumferential surface 13*b* of the output portion 13. The internal teeth 19 are pin-shaped (cylindrical) teeth provided on the inner circumferential surface 13*b* of the output portion 13. The plurality of internal teeth 19 are provided on a most of the axially central part of the inner circumferential surface 13*b*. The internal teeth 19 are arranged at equal intervals in the circumferential direction.

Bearing housings 21, 22 are integrally formed on the radially inner side of the seal receiving recesses 16, 17 and on the radially outer side of the inner teeth 19. The bearing housings 21, 22 protrudes axially outward from the corresponding steps 16*a*, 17*a*, respectively. Each of the bearing housings 21, 22 is formed in a cylindrical shape centered on the rotor rotation axis A1. The bearing housing 21 is provided with a bearing 23*a* (first bearing 23*a*). The bearing housing 22 is provided with a bearing 23*a* (second bearing 23*a*).

Of the bearings 23*a*, 23*b*, the first bearing 23*a* disposed closer to the motor 2 is radially aligned with the first floating seal 18*a* disposed closer to the motor section 2 in the output portion 13. Of the bearings 23*a*, 23*b*, the second bearing 23*b* disposed away from the motor section 2 is radially aligned with the second floating seal 18*b* disposed away from the motor 2 in the output portion 13. The fixed portion 12 is rotatably supported by the output portion 13 via the bearings 23*a*, 23*b*.

<Fixed Portion>

The fixed portion 12 includes an end plate 24 and a base plate 25 arranged side by side in the axial direction. The end plate 24 is disposed close to the motor 2. The end plate 24 has a disk-shaped end plate body 26 that is rotatably supported by the first bearing 23*a*. A circular annular block 27 is integrally formed on an outer circumference 26*a* of the end plate body 26. The annular block 27 protrudes radially outward from the outer circumferential surface 26*a* of the end plate body 26. The annular block 27 protrudes toward the motor 2 from an end surface 26*b* of the end plate body 26 on the motor 2 side.

The annular block 27 covers the first bearing 23*a* and the first floating seal 18*a* from the outside in the axial direction. A third seal receiving recess 28 is formed in a first end surface 27*a* of the annular block 27 on the output portion 13 side. The third seal receiving recess 28 is disposed at the position facing the first seal receiving recess 16 in the axial direction. The third seal receiving recess 28 is formed in a circular shape viewed in the axial direction. A third floating seal 18*c* is provided in the third seal receiving recess 28. The motor case 4 is fixed to the second end surface 27*b* of the annular block 27 on the motor 2 side.

The base plate 25 is disposed facing away from the motor 2 with the end plate 24 interposed therebetween. The base plate 25 has a disc-shaped base plate body 29 that is rotatably supported by the second bearing 23*b*. Three cylindrical columns 31 are integrally formed with the first end surface 29*a* of the base plate body 29 on the motor 2 side (end plate 24 side). The three columns 31 protrude from the first end surface 29*a* toward the motor 2. The three columns 31 are arranged at equal intervals in the circumferential direction. The end plate body 26 is disposed at tips 31*a* of the columns 31. The end plate body 26 is fastened to the pillars 31 by bolts 32. In this state, a space having a given width in the axial direction is formed between the end plate body 26 and the base plate body 29.

A center through-hole 33 is formed in the radially center of the end plate body 26. A center through-hole 34 is formed in the radially center of the base plate body 29. A bearing 37 is provided in each of the center through-holes 33 and 34. In the end plate body 26 and the base plate body 29, a plurality (e.g., three in this embodiment) of crank through-holes 35 and 36 are formed around the center through holes 33 and 34 respectively. The crank through holes 35 are arranged at equal intervals in the circumferential direction. The plurality of crankshaft through-holes 36 are arranged at equal intervals in the circumferential direction. A bearing 38 is provided in each of the crank through-holes 35 and 36. Each of the bearings 37, 38 is used to rotatably support a portion of the speed reduction mechanism 14 on the end plate body 26 and the base plate body 29.

<Speed Reduction Mechanism>

The speed reduction mechanism 14 is an eccentric oscillation speed reduction mechanism. The speed reduction mechanism 14 includes as its main components an input shaft 41, a plurality of crankshafts 42, and two oscillating gears 43, 44. The input shaft 41 is inserted into the center through-holes 33, 34. The plurality of crankshafts 42 are inserted through the crank through holes 35, 36. The two oscillating gears 43, 44 are situated between the end plate body 26 and the base plate body 29. The input shaft 41 is rotatably supported by the end plate body 26 and the board body 29 via the bearings 37 in the center through holes 33 and 34. The input shaft 41 extends coaxially with the rotor rotation axis A1. The crankshaft 42 is rotatably supported by the end plate body 26 and base plate body 29 via the bearings 38 in crank through-holes 35 and 36. The crank rotation axis A2 of the crankshaft 42 extends parallel to the rotor rotation axis A1.

The input shaft 41 is connected to an end 10*a* of the rotor shaft 10 on the speed reducer 3 side. The input shaft 41 rotates together with the rotor shaft 10. The input gear 45 is fitted and fixed to a portion of the input shaft 41 on the motor 2 side. A transmission gear 46 meshing with the input gear 45 is fitted and fixed to the crankshaft 42. A first eccentric portion 42*a* and a second eccentric portion 42*b* are formed at substantially the axial center of the crankshaft 42 and between the end plate body 26 and the base plate body 29.

The first eccentric portion 42*a* is disposed on the end plate body 26 side. The second eccentric portion 42*b* is disposed on the base plate body 29 side. Each eccentric portion 42*a*, 42*b* is provided eccentrically with reference to the crank rotation axis A2. The first and second eccentric portions 42*a* and 42*b* are out of phase with each other. The first oscillating gear 43 is rotatably supported by the first eccentric portion 42a via the first bearing 47. The second oscillating gear 44 is rotatably supported by the second eccentric portion 42b via the second bearing 48.

Crank through-holes 51 and 52 are formed in the first and second oscillating gears 43 and 44, respectively, at the positions corresponding to the crankshaft 42. The first bearing 47 is fitted and secured in the crank through-hole 51 of the first oscillating gear 43. The second bearing 48 is fitted and secured in the crank through-hole 52 of the second oscillating gear 44. Center through-holes 53 and 54 are formed in the oscillating gears 43 and 44, respectively, at the radial center thereof. The input shaft 41 is inserted in the center through-holes 53 and 54. The outer circumferences of the oscillating gears 43, 44 have outer teeth 43a, 44a, respectively, that mesh with the inner teeth 19 of the output portion 13.

A circular plate shaped cover 60 (an example of a second member in the claim) is provided on a second end surface 29b of the base plate body 29 facing away from the motor 2. The cover 60 is fastened and secured to the base plate body 29 by bolts 61. The diameter of the cover 60 is approximately the same as the outer surface 13a of the output portion 13. Thus, the cover 60 covers the second opening 13e of the output portion 13 situated close to the cover 60 in the axial direction. In other words, the cover 60 covers the second floating seal 18b from the outside in the axial direction. The cover 60 is made of the same material with a seal ring 71 described below of the second floating seal 18b.

<Seal Device>
<Floating Seal>

The three floating seals 18a, 18b, and 18c in the drive device 1 prevent dust and other particles from entering the inside of the speed reducer 3 and lubricant and other substances from leaking from the inside of the speed reducer 3 to the outside. This preventive measure is hereinafter referred to as "sealing".

The three floating seals 18a, 18b, and 18c have the same configuration. Therefore, in the following description, of the three floating seals 18a, 18b, and 18c, only the second floating seal 18b, which is one component of the seal device 70, will be described in detail. Like elements and components of the other two floating seals 18a and 18c are labeled with same or similar designations and numbering as those of the second floating seal 18b, and thus description thereof will be omitted.

Figure 3:
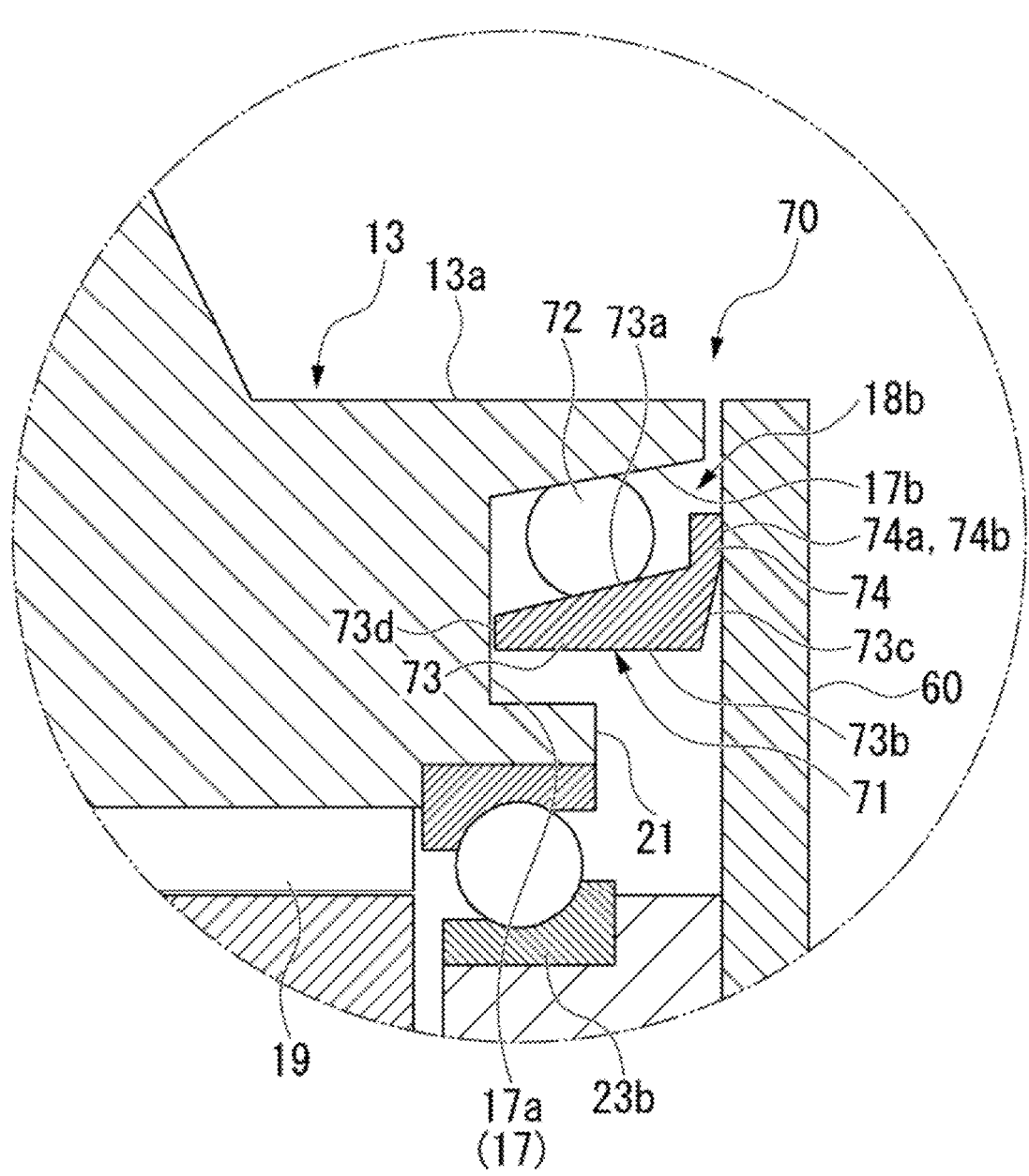
FIG. 3 is an enlarged view of a part III of FIG. 2.

FIG. 3 is an enlarged view of the part III of FIG. 2. As shown in FIGS. 2 and 3, the second floating seal 18b includes a seal ring 71 and an O-ring 72. The seal ring 71 is spaced apart from an inner circumferential surface 17b of the second seal receiving recess 17 in the radial direction. The seal ring 71 has an annular shape. The O-ring 72 is disposed between the seal ring 71 and the inner circumferential surface 17b of the second seal receiving recess 17. The seal ring 71 is made of cast iron. The seal ring 71 is preferably made of high-chromium cast iron. When the seal ring 71 is made of high-chromium cast iron, it has high thermal conductivity and high wear resistance (sliding properties). However, the material and method for fabricating the seal ring 71 are not limited to this. Various materials can be used to fabricate the seal ring 71.

In the seal ring 71, a circular ring body 73 and a brim 74 are integrally formed. The brim 74 extends radially outward from the end of the ring body 73 on the cover 60 side. The ring body 73 has a tapered outer circumferential surface 73a, an inner circumferential surface 73b, a tapered surface 73c, and a back surface 73d. The tapered outer circumferential surface 73a faces the inner circumferential surface 17b of the second seal receiving recess 17 in the radial direction. The inner circumferential surface 73b faces the tapered outer circumferential surface 73a in the radial direction. The tapered surface 73c is formed at the end of inner circumferential surface 73b on the cover 60 side The back surface 73d connects the tapered outer circumferential surface 73a and the inner circumferential surface 73b at the end opposite to the brim 74.

The tapered outer circumferential surface 73a is sloped so that the outer diameter gradually increases in the direction from the back surface 73d toward the brim 74. The tapered surface 73c is sloped so that the inner diameter gradually increases from the inner circumferential surface 73b toward the cover 60. An end surface 74a of the brim 74 on the cover 60 side is flat along the radial direction. The end surface 74a is a surface serving as a seal surface 74b. The end surface 74a contacts the cover 60.

The O-ring 72 is elastically deformable. The O-ring 72 is disposed between the inner circumferential surface 17b of the second seal receiving recess 17 and the tapered outer circumferential surface 73a of the ring body 73 in a slightly compressed state. Since the inner circumferential surface 17b and the tapered outer circumferential surface 73a are formed to be inclined, the seal surface 74b of the brim 74 is pressed against the cover 60 by the O-ring 72. At the same time, the cover 60 holds down the seal surface 74b of the brim 74 from the radially outside. This seals the gap between the cover 60 and the seal ring 71. The O-ring 72 seals between the inner circumferential surface 17b of the second seal receiving recess 17 and the seal ring 71. In other words, the second floating seal 18b seals between the output portion 13 and the cover 60.

The first floating seal 18a and the third floating seal 18c are arranged so that they overlap each other to seal between the output portion 13 and the annular block 27. More specifically, the floating seals 18a and 18c are arranged so that the seal surfaces 74b of the seal rings 71 butt up against each other. This seals between the seal surfaces 74b.

<Operation of Drive Device>

Next, a description is given of operation of the drive device 1. When the rotor shaft 10 is driven and rotated by the motor 2, the input shaft 41 is rotated together with the rotor shaft 10. Since the input gear 45 on the input shaft 41 is meshed with the transmission gear 46 on the crankshaft 42, the rotation of the input shaft 41 is transmitted to the crankshaft 42. In this way, each crankshaft 42 is rotated. Then, the oscillating gears 43 and 44 are oscillatory rotated while meshing with the internal teeth 19 of the output portion 13.

Thus, the fixed portion 12 and the output portion 13 are rotated relative to each other. The rotation of the rotor shaft 10 is decelerated and transmitted by the speed reduction mechanism 14 to the output portion 13. The fixed portion 12 is fixed to the motor case 4. The motor case 4 is fixed to the boom 108. The output portion 13 is fixed to the arm 109. Therefore, the arm 109 is rotated about the rotor rotation axis A1 with respect to the boom 108.

The fixed portion 12 includes the annular block 27 on the end plate 24 and the cover 60 fastened to the base plate 25. Thus, the seal surface 74b of the seal ring 71, which constitutes the second floating seal 18b, and the cover 60 slide relative to each other. While sliding, the second floating seal 18b seals between the output portion 13 and the cover 60. The sealing surfaces 74b of the sealing rings 71 for the first floating seal 18a and the third floating seal 18c also slide relative to each other. While sliding, the first floating seal 18*a* and the third floating seal 18*c* seal between the output portion 13 and the end plate 24 (annular block 27).

As described above, the seal device 70 described above includes the output portion 13 as the first member, the cover 60 as the second member, and the second floating seal 18*b*. The second seal receiving recess 17 having the inner surface 17*b* is formed in the output portion 13. The cover 60 rotates relative to the output portion 13 and is disposed to face the output portion in the axial direction. The second floating seal 18*b* is disposed in the second seal receiving recess 17. The second floating seal 18*b* includes the seal ring 71 and the O-ring 72. The O-ring 72 presses the seal surface 74*b* of the seal ring 71 against the cover 60. This ensures sealing between the seal ring 71 and the cover 60.

Therefore, instead of using a pair of floating seals (seal rings 71) used in the prior art, the single seal ring 71 can be used as the seal device 70. This allows the seal device 70 to be downsized while ensuring high sealing performance and durability of the seal device 70. The cover 60 is attached to the fixed portion 12 as the third member rotatably relative to the output portion 13. The cover 60, which constitutes the speed reducer 3, is also used as a part of the seal device 70. Therefore, the speed reducer 3 with the seal device 70 can be downsized.

The first floating seal 18*a* and the second floating seal 18*b* are disposed alongside the corresponding bearings 23*a*, 23*b* in the radial direction. This allows the axial length of the speed reducer 3 to be shortened compared to the case where each of the floating seals 18*a* and 18*b* and the bearings 23*a* and 23*b* are arranged alongside each other in the axial direction. The seal device 70 can be suitably used in such a configuration of the speed reducer 3. The excavator 100 equipped with the seal devices 70 can have high sealing performance and be smaller in size to achieve a highly functional excavator 100.

The above embodiment describes a case in which the output portion 13 is the first member and the cover 60 is the second member, and the seal surface 74*b* of the seal ring 71 is pressed against the cover 60 by the O-ring 72, thereby ensuring sealing between the seal ring 71 and the cover 60. However, the embodiment is not limited to such a case, and the first and second members can be combined in various ways. The following gives the details.

First Modification Example

Figure 4:
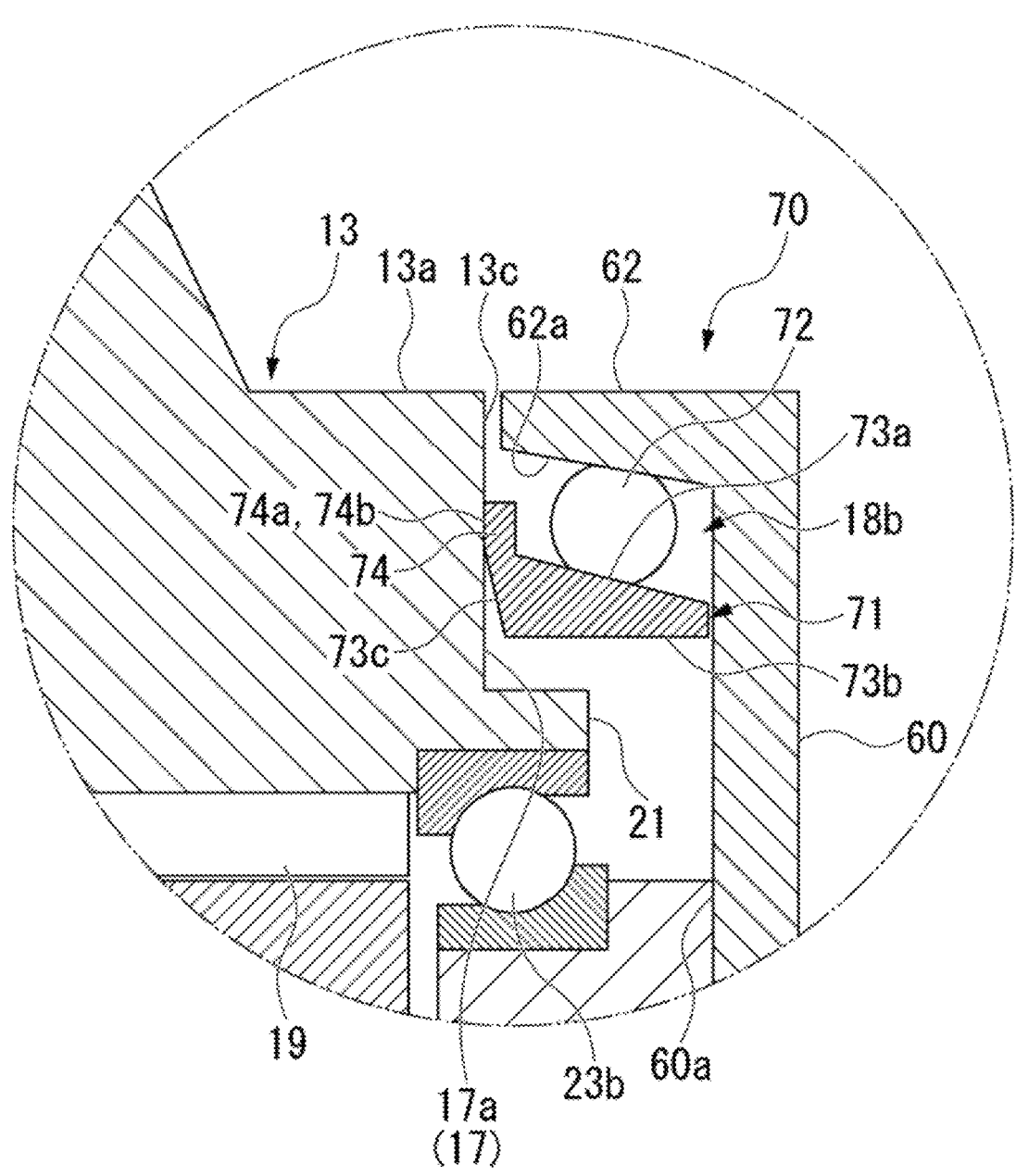
FIG. 4 is a sectional view of a seal device according to a first modification example of the embodiment of the disclosure.

FIG. 4 is a sectional view of the seal device 70 according to a first modification example of the embodiment. FIG. 4 corresponds to FIG. 3 referred to in the above. As shown in FIG. 4, the second floating seal 18*b* may be configured so that its installation orientation is reversed. In this case, instead of providing the second seal receiving recess 17 in the output portion 13, a circular seal receiving housing 62 is provided in one surface 60*a* of the cover 60 on the output portion 13 side. The seal receiving housing 62 has an inner circumferential surface 62*a*. The inner circumferential surface 62*a* is sloped so that the inner diameter gradually increases toward the output portion 13.

The seal ring 71 of the second floating seal 18*b* is spaced apart in the radial direction from the inner circumferential surface 62*a* of the seal receiving housing 62. The O-ring 72 is disposed between the inner circumferential surface 62*a* of the seal receiving housing 62 and the tapered outer circumferential surface 73*a* of the seal ring 71. In this configuration, the O-ring 72 presses the sealing surface 74*b* of the brim 74 toward the end surface 13*c* of the output portion 13 on the cover 60 side. In other words, the output portion 13 becomes the second member and the cover 60 becomes the first member. Even in this case, the same effect as that of the above-described embodiment is obtained.

Second Modification Example

Figure 5:
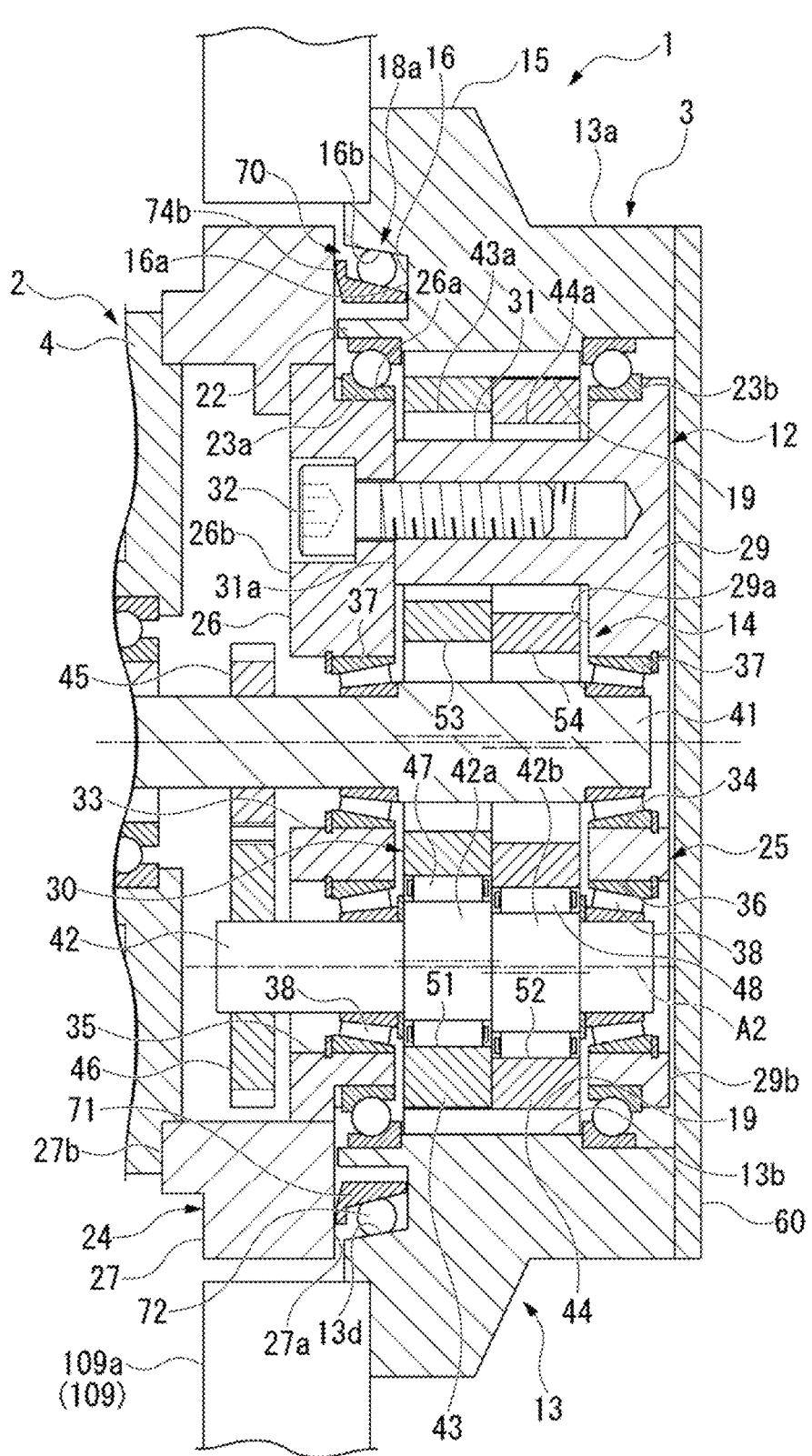
FIG. 5 is a sectional view of a speed reducer according to a second modification example of the embodiment of the disclosure.

FIG. 5 is a sectional view of the speed reducer 30 according to a second modification example of the embodiment. The above embodiment describes the case in which the seal device 70 includes the second floating seal 18*b* and the cover 60. However, the disclosure is not limited to such an embodiment. As shown in FIG. 5, the seal device 70 may include the first floating seal 18*a* on the side of the output portion 13 away from the cover 60 and the annular block 27 facing the first floating seal 18*a* in the axial direction.

In this case, the third seal receiving recess 28 is not formed in the first end surface 27*a* of the annular block 27 and the third floating seal 18*c* is not provided. In this configuration, the seal surface 74*b* of the seal ring 71 is pressed against the first end surface 27*a* of the annular block 27 by the O-ring 72 of the first floating seal 18*a*. Whereas the annular block 27 presses against the seal surface 74*b* of the seal ring 71 from the axially outside. In other words, the output portion 13 becomes the first member and the end plate 24 (annular block 27) becomes the second member. Thus, the first floating seal 18*a* seals between the output portion 13 and the end plate 24 (annular block 27). The annular block 27 can be considered as a cover that closes the first opening 13*d* in the output portion 13 on the motor 2 side. The second modification example described above thus produces the same effects as the foregoing embodiment.

Third Modification Example

Figure 6:
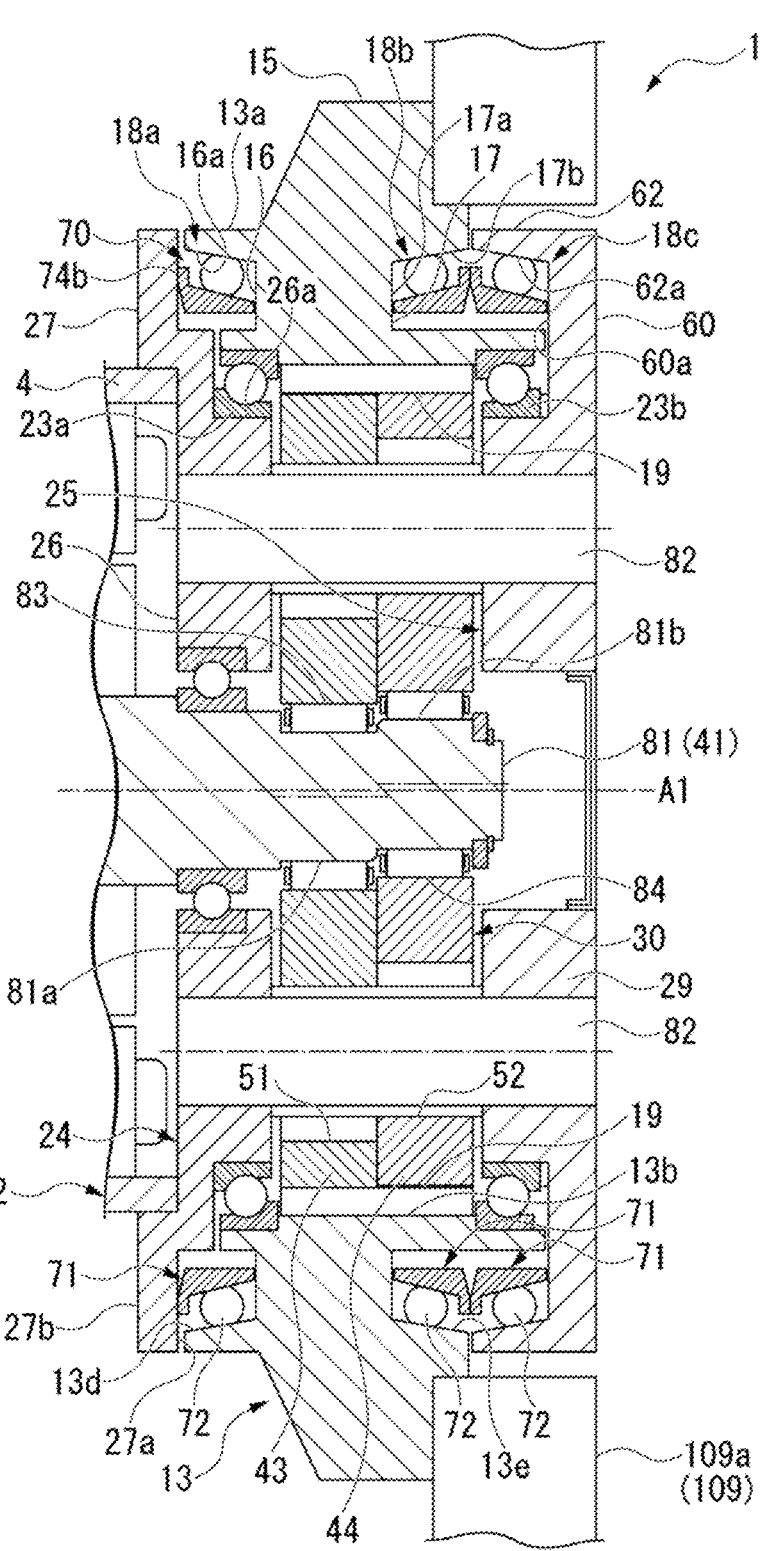
FIG. 6 is a sectional view showing a speed reducer according to a third modification example of the embodiment of the disclosure.

FIG. 6 is a sectional view of the speed reducer 30 according to a third modification example of the embodiment. In the above embodiments, the case in which the speed reduction mechanism 14 of the speed reducer is an eccentric oscillation speed reduction mechanism have been described. The eccentric oscillating reduction mechanism in the above embodiments has a plurality (e.g., three) of crankshafts 42 arranged around the input shaft 41. By rotating these crankshafts 42, the oscillating gears 43 and 44 are rotated. However, the disclosure is not limited to such an embodiment. Alternatively, as shown in FIG. 6, the input shaft 41 may be a center crankshaft 81. In this case, the crankshaft 42 is replaced by a connecting shaft 82 that does not have eccentric portions 42*a* and 42*b*. The connecting shaft 82 connects the end plate body 26 and the base plate body 29.

A first eccentric portion 81*a* and a second eccentric portion 82*b* are formed at substantially the axial center of the crankshaft 81 and between the end plate body 26 and the base plate body 29. The first eccentric portion 81*a* is disposed on the end plate body 26 side. The second eccentric portion 81*b* is disposed on the base plate body 29 side. Each eccentric portion 81*a*, 81*b* is provided eccentrically with reference to the rotor rotation axis A1. The first and second eccentric portions 81*a* and 82*b* are out of phase with each other. The first oscillating gear 43 is rotatably supported by the first eccentric portion 81*a* via the first bearing 83. The second oscillating gear 44 is rotatably supported by the second eccentric portion 81*b* via a second bearing 84.

In this configuration, the center crankshaft 81 is rotated together with the rotor shaft 10. As the center crankshaft 81 rotates, each of the oscillating gears 43 and 44 are oscillatory rotated. The third modification example described above thus produces the same effects as the foregoing embodiment.

In addition, the third modification example does not require the input gear 45 and transmission gear 46 (see FIG. 2) to transmit rotational force to each crankshaft 42 as in the aforementioned embodiment. Therefore, there is no need to provide space for the input gear 45 and transmission gear 46 on the end plate body 26 on the motor 2 side. This allows the axial thickness of the annular block 27 to be reduced. The annular block 27 and the first floating seal 18*a* can form the seal device 70.

In the third modification example, the base plate portion 25 and the cover 60 are formed as one piece, and the third floating seal 18*c* is provided on the cover 60. The annular seal receiving housing 62 is formed in the surface 60*a* of the cover 60 on the output portion 13 side. The third floating seal 18*c* is provided in the seal receiving housing 62. The installation orientation of the third floating seal 18*c* is the same as that of the second floating seal 18*b* in the first modification example (see FIG. 4). Thus, the seal surface 74*b* of the second floating seal 18*b* and the seal surface 74*b* of the third floating seal 18*c* butt up against each other. This seals between the output portion 13 and the cover 60.

The third modification example describes the case in which the two floating seals 18*b* and 18*c* are used to seal between the output portion 13 and the cover 60. However, the disclosure is not limited to such a modification example. As in the embodiment described above, the seal device 70 (second floating seal 18*b* and cover 60) may be used to seal between the output portion 13 and the cover 60.

The disclosure is not limited to the above-described embodiments and modification examples. Various modifications can be made to these embodiments without departing from the true scope and spirit of the present disclosure. For example, in the above-described embodiment, the construction machine was the excavator 100. However, the disclosure is not limited to such an embodiment. The configuration of the above embodiments and modification examples can be adopted for various construction machines having two members that can rotate relative to each other. In addition to construction machinery, the configurations of the above embodiments and modification examples can be employed in driving devices having two members that can rotate relative to each other.

The above embodiment describes the case in which the output portion 13 is rotated relative to the fixed portion 12. However, the disclosure is not limited to such an embodiment. Alternatively, the output portion 13 may be fixed and the fixed portion 12 may be rotated relative to the output portion 13. Then, the member fixed to the fixed portion 12 may be rotated about the rotor rotation axis A1.

The above embodiment describes the case in which the cover 60 is made of the same material as the seal rings 71 of the floating seals 18*a* to 18*c*. However, the disclosure is not limited to such an embodiment. The material of the cover 60 may be different from the material of the seal rings 71. The stiffness of the cover 60 is preferably the same as that of the seal rings 71.

In the embodiment described above, the speed reduction mechanism 14 is described as the eccentric oscillating type reduction mechanism having the crankshaft 42 or center crankshaft 81, as well as the oscillating gears 43 and 44. However, the disclosure is not limited to such an embodiment. Various reduction mechanisms can be applied. For example, a planetary gear reduction mechanism can be used instead of the eccentric oscillating type reduction mechanism. Instead of a deceleration mechanism, a speed-increasing mechanism that increases the speed of rotation of the rotor shaft 10 and outputs the increased rotation can be used.

Alternatively, it may be a transmission mechanism that simply transmits power without either deceleration or speed increase. A mere rotating device may be used in place of the speed reducer 3.

The above embodiment describes the case in which the O-ring 72 is used as an elastic ring disposed on the tapered outer circumferential surface 73*a* of the seal ring 71. However, the disclosure is not limited to such an embodiment. Any elastic deformable members may be used in place of the O-ring 72. In the above embodiment, the case where the cover 60 is fastened and secured to the base plate portion 25 (base plate body 29) by bolts 61 has been described. However, the disclosure is not limited to such an embodiment. The base plate portion 25 and the cover 60 may be integrally formed.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

What is claimed is:

1. A seal device comprising:
    a first member having an inner circumferential surface;
    a second member rotating relative to the first member, the second member facing the first member in a rotation axis direction;
    a third member rotatable relative to the first member, the third member being received in the first member;
    a seal ring having:
        an outer circumferential surface that faces the inner circumferential surface in a radial direction and is spaced apart from the inner circumferential surface;
        a back surface in contact with the first member; and
        a seal surface in sliding contact with the second member;
    an elastically deformable elastic ring disposed between the inner circumferential surface of the first member and the outer circumferential surface of the seal ring;
    wherein the first member is formed in an annular shape with an opening,
    wherein the second member is a cover provided at an end of the third member in the rotation axis direction,
    wherein the cover closes the opening of the first member, and
    wherein the elastic ring presses the seal surface of the seal ring against the second member to seal between the seal surface and the second member.

2. The seal device of claim 1, wherein the first member and the third member are rotatable relative to each other via bearings, and
    wherein the seal ring and the elastic ring are arranged in line with the respective bearings in the radial direction, which is perpendicular to the rotation axis direction.

3. The seal device of claim 2, further comprising a transmission mechanism connecting the first member and the third member,
    wherein the transmission mechanism changes speed of rotation of one of the first member or the third member and transmits the rotation to the other of the first member or the third member.

4. A construction machine comprising:
    the seal device of claim 1; and
    a vehicle body having a moving part in which the seal device is provided,

wherein the first member is attached to the moving part, and wherein the second member is attached to the moving part.

5. The seal device of claim 1, wherein the second member has a flat surface formed to face the first member, the seal ring, and the elastic ring in the rotation axis direction, and extending inward in the radial direction from an outer peripheral surface of the second member, and wherein the elastic ring presses the seal surface of the seal ring against the flat surface the second member to seal between the seal surface and the flat surface of the second member.

* * * * *